(12) United States Patent
Lee (10) Patent No.: US 10,782,470 B2
(45) Date of Patent: Sep. 22, 2020

(54) DISPLAY APPARATUS INCLUDING DICHROIC FILTER

(71) Applicant: SAMSUNG ELECTRONICS CO., LTD., Suwon-si (KR)

(72) Inventor: Kye Hoon Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 15 days.

(21) Appl. No.: 15/802,696

(22) Filed: Nov. 3, 2017

(65) Prior Publication Data

US 2018/0156967 A1  Jun. 7, 2018

(30) Foreign Application Priority Data

Dec. 5, 2016  (KR) .................. 10-2016-0164371

(51) Int. Cl.
  G02B 6/00    (2006.01)
  F21V 8/00    (2006.01)
  G02F 1/13357 (2006.01)
  G02F 1/1333  (2006.01)

(52) U.S. Cl.
  CPC ......... *G02B 6/0068* (2013.01); *G02B 6/0026* (2013.01); *G02F 1/1336* (2013.01); *G02B 6/009* (2013.01); *G02B 6/0073* (2013.01); *G02F 1/133615* (2013.01); *G02F 2001/133317* (2013.01); *G02F 2001/133614* (2013.01)

(58) Field of Classification Search
  CPC ............ G02F 1/1336–133615; G02B 6/00–08
  See application file for complete search history.

(56) References Cited

U.S. PATENT DOCUMENTS

| 6,774,963 B1 * | 8/2004 | Nakao ............... G02F 1/133514 349/104 |
| 2012/0236406 A1 | 9/2012 | Hur et al. |
| 2012/0257417 A1 | 10/2012 | Lee et al. |
| 2012/0307518 A1 | 12/2012 | Lee et al. |
| 2013/0050616 A1 | 2/2013 | Seo et al. |

(Continued)

FOREIGN PATENT DOCUMENTS

| JP | 2010157468 A * | 7/2010 |
| KR | 10-2013-0019791 A | 2/2013 |

(Continued)

OTHER PUBLICATIONS

"Optics." Optics, by Eugene Hecht, Addison-Wesley, 2002, pp. 119-122. (Year: 2002).*

(Continued)

*Primary Examiner* — Gerald J Sufleta, II
(74) *Attorney, Agent, or Firm* — Sughrue Mion, PLLC (57) ABSTRACT

Disclosed is a display apparatus including a display panel, a light guiding plate disposed behind the display panel, a light source disposed to oppose a side of the light guiding plate, a dichroic filter that selectively transmits blue light disposed to cover a front side of a space between the light source and the side of the light guiding plate, and a black member disposed in front of the dichroic filter. Here, since light emitted forward from the light source toward the dichroic filter is generally absorbed by the black member or incident on the light guiding plate, the occurrence of bright parts caused by light leakage is suppressed.

18 Claims, 5 Drawing Sheets

(56) References Cited

U.S. PATENT DOCUMENTS

| | | | |
|---|---|---|---|
| 2015/0198756 A1 | 7/2015 | Song et al. | |
| 2015/0241618 A1* | 8/2015 | Jung | G02B 6/0031 349/65 |
| 2015/0338064 A1* | 11/2015 | Ishino | G02B 6/0023 349/61 |
| 2015/0339996 A1* | 11/2015 | Schuck | H04N 13/334 348/58 |
| 2016/0103267 A1* | 4/2016 | An | G02B 6/0023 362/606 |
| 2017/0168217 A1* | 6/2017 | Li | G02B 6/0068 |

FOREIGN PATENT DOCUMENTS

| | | |
|---|---|---|
| KR | 10-2016-0044137 A | 4/2016 |
| KR | 10-2016-0045213 A | 4/2016 |
| KR | 10-2016-0073453 A | 6/2016 |

OTHER PUBLICATIONS

Search Report dated Mar. 13, 2018, issued by the International Searching Authority in counterpart International Patent Application No. PCT/KR2017/012225 (PCT/ISA/210).

Communication dated Aug. 5, 2019, issued by the European Patent Office in counterpart European Application No. 17879269.3.

* cited by examiner

DISPLAY APPARATUS INCLUDING DICHROIC FILTER

CROSS-REFERENCE TO RELATED APPLICATION

This application claims the benefit of Korean Patent Application No. 10-2016-0164371, filed on Dec. 5, 2016 in the Korean Intellectual Property Office, the disclosure of which is incorporated herein by reference.

BACKGROUND

1. Field

Embodiments of the present disclosure relate to a display apparatus including a backlight including a light guide plate and a light source that emits light toward a side of the light guide plate.

2. Description of the Related Art

Display apparatuses may be apparatuses that receive an image signal and display a screen, such as a television, a monitor, and the like.

A display apparatus includes a display panel formed with a liquid crystal panel and a backlight disposed behind the display panel to supply light to the display panel.

Among display apparatuses, there is an edge type display apparatus in which a backlight includes a light guide plate and a light source disposed to emit light toward a side of the light guide plate and emit light toward the side of the light guide plate.

In the case of the edge type display apparatus, since a relatively large amount of light is inevitably supplied to a side portion of the display panel adjacent to the light source, a bright part that is relatively brighter than other parts of the display panel may be generated.

SUMMARY

Therefore, it is an aspect of the present disclosure to provide a display apparatus capable of suppressing the occurrence of a bright part that may be generated at an area of a display panel adjacent to a light source.

Additional aspects of the present disclosure will be set forth in part in the description which follows and, in part, will be obvious from the description, or may be learned by practice of the present disclosure.

In accordance with one aspect of the present disclosure, a display apparatus includes a display panel, a light guide plate disposed behind the display panel, a light source disposed to emit light toward a side of the light guide plate, a dichroic filter disposed to cover a front of a space between the light source and the side of the light guide plate, and a black member disposed in front of the dichroic filter.

The light source may include a plurality of light emitting diodes (LEDs) arranged to emit light toward the side of the light guide plate, and the dichroic filter may be disposed to cover the front of the space between the plurality of LEDs and the side of the light guide plate.

The display apparatus may further include a fluorescent sheet formed with a yellow color and disposed between the display panel and the light guide plate. Here, the plurality of LEDs may comprise blue LEDs configured to generate blue light.

The fluorescent sheet may include a quantum dot sheet.

The display apparatus may further include a middle mold that supports an outer portion of the display panel. Here, the middle mold may include a mount onto which the outer portion of the display panel is mounted and supported, and the black member and the dichroic filter may be arranged on a rear surface of the mount.

The display panel may include a quantum dot color filter.

The plurality of LEDs may comprise blue LEDs configured to generate blue light, and the quantum dot color filter may include a red light converter configured to convert the blue light into red light, a green light converter configured to convert the blue light into green light, and a light transmission portion configured to transmit the blue light.

The side of the light guide plate may be disposed at an edge of the light guide plate.

The light guide plate may be configured to transmit light in a forward direction toward the display panel. An optical axis of the light emitted by the light source may be perpendicular to the forward direction.

In accordance with one aspect of the present disclosure, a display apparatus includes a display panel, a light guide plate disposed behind the display panel, a quantum dot sheet disposed between the display panel and the light guide plate, a plurality of LEDs configured to generate blue light and disposed to emit light toward a side of the light guide plate, a dichroic filter disposed to cover a front of a space between the plurality of LEDs and the side of the light guide plate, and a black member disposed in front of the dichroic filter.

The side of the light guide plate may be disposed at an edge of the light guide plate.

The light guide plate may be configured to transmit light in a forward direction toward the display panel. An optical axis of the light emitted by the light source may be perpendicular to the forward direction.

In accordance with one aspect of the present disclosure, a display apparatus includes a display panel comprising a quantum dot color filter, a light guide plate disposed behind the display panel, a plurality of LEDs configured to generate blue light and disposed to emit light toward a side of the light guide plate, a dichroic filter disposed to cover a front of a space between the plurality of LEDs and the side of the light guide plate, and a black member disposed in front of the dichroic filter.

The quantum dot filter may include a red light converter configured to convert the blue light into red light, a green light filter configured to convert the blue light into green light, and a light transmission portion configured to transmit the blue light.

The side of the light guide plate may be disposed at an edge of the light guide plate.

The light guide plate may be configured to transmit light in a forward direction toward the display panel. An optical axis of the light emitted by the light source may be perpendicular to the forward direction.

BRIEF DESCRIPTION OF THE DRAWINGS

These and/or other aspects of the present disclosure will become apparent and more readily appreciated from the following description of the embodiments, taken in conjunction with the accompanying drawings of which.

DETAILED DESCRIPTION

Embodiments disclosed in the present specification and components shown in the drawings are merely preferable examples, and various modifications capable of replacing the embodiments and drawings of the present specification may be made at the time of filing the present application.

Also, throughout the drawings of the present specification, like reference numerals or symbols refer to components or elements configured to perform substantially identical functions.

Also, the terms used herein are for explaining the embodiments but are not intended to limit and/or define the present disclosure. Singular forms, unless otherwise defined in context, include plural forms. Throughout the specification, the terms "comprise," "include," "have," or the like are used to specify the presence of stated features, numbers, steps, operations, elements, components, or combinations thereof, but do not preclude the presence or addition of one or more other features, numbers, steps, operations, elements, components, or combinations thereof.

Also, even though the terms including ordinals such as first, second, and the like may be used for describing various components, the components are not limited by the terms, and the terms are used only for distinguishing one component from others. For example, without departing from the scope of the present invention, a first component may be referred to as a second component, and similarly, the second component may be referred to as the first component. The term "and/or" includes one or any and all combinations of a plurality of associated listed items.

Also, the terms "front end," "rear end," "above," "below," "top end," "bottom end," and the like, when used herein, are defined on the basis of the drawings, and shapes and positions of components are not limited thereto.

Hereinafter, a display apparatus according to embodiments of the present disclosure will be described with reference to the drawings.

Figure 1:
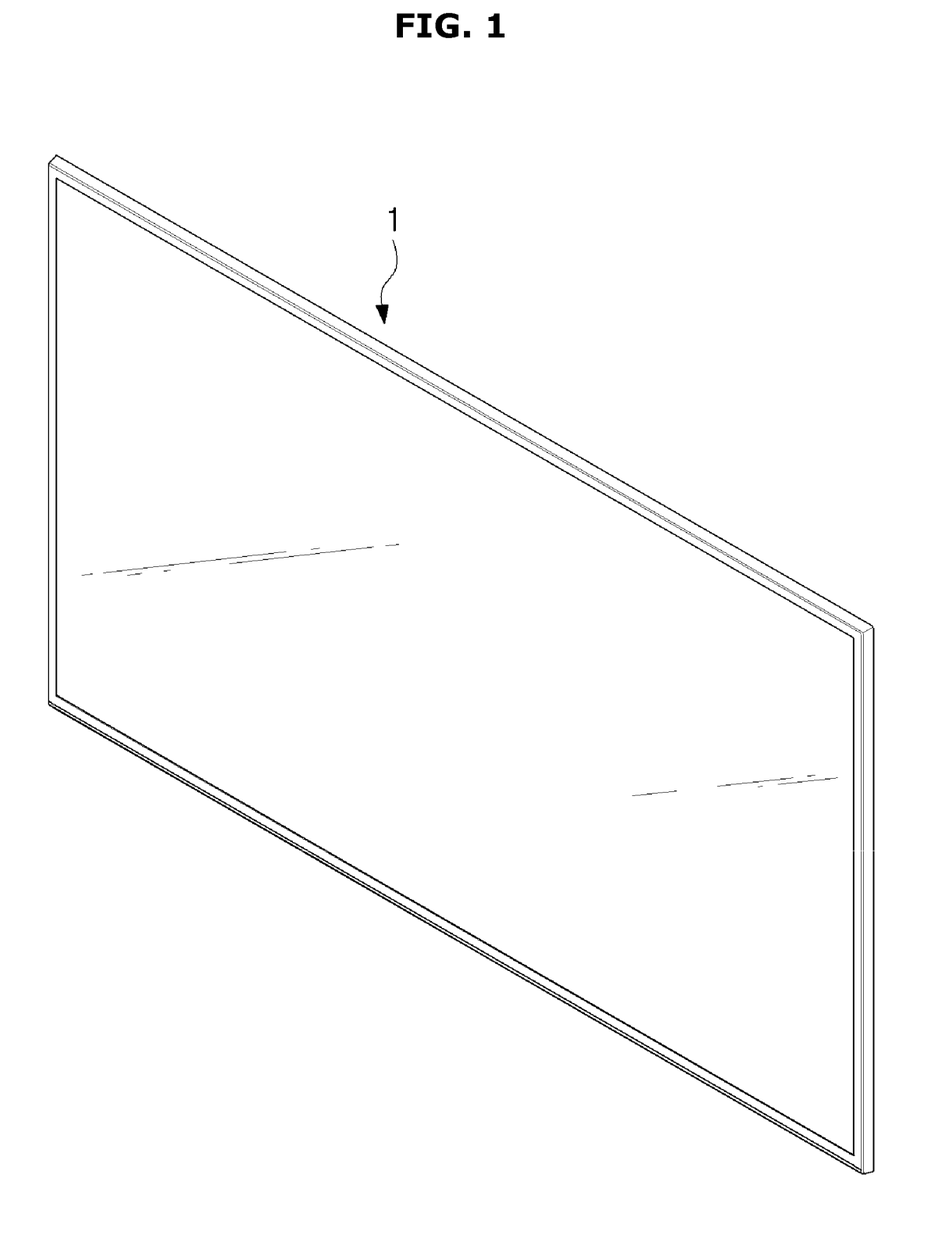
FIG. 1 is a perspective view of a display apparatus to which the present disclosure is applied.

As shown in FIG. 1, a display apparatus according to a first embodiment of the present disclosure includes a display unit 1.

Figure 2:
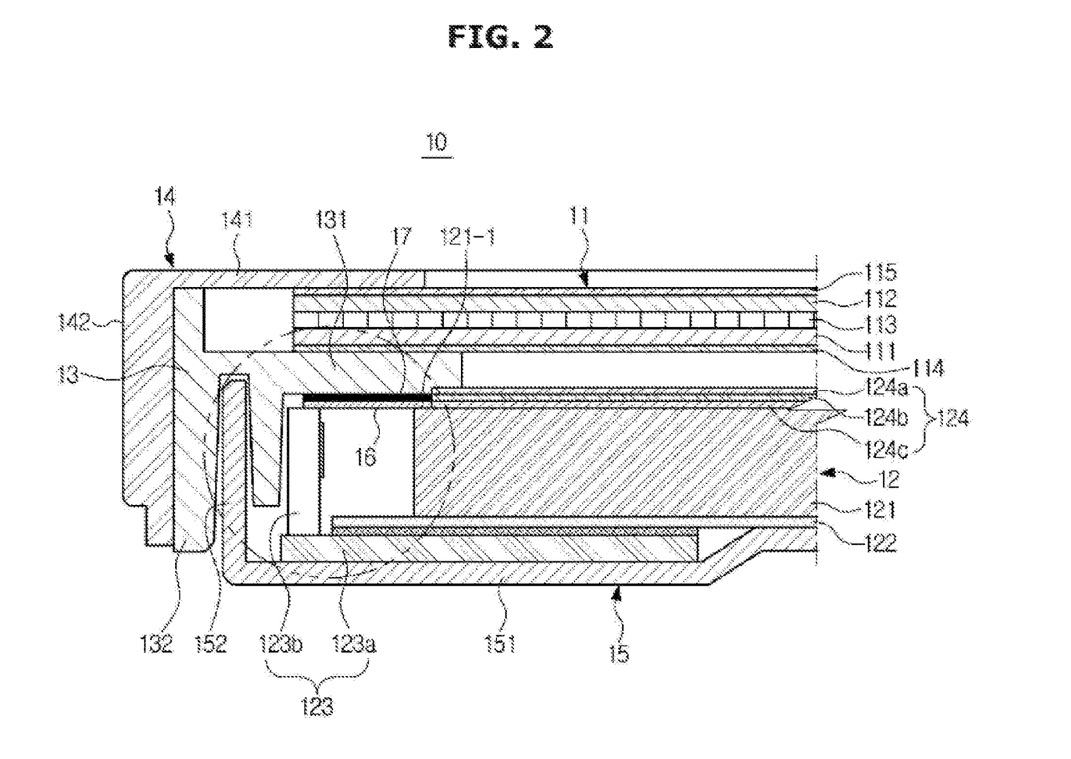
FIG. 2 is a cross-sectional view of a display apparatus according to a first embodiment of the present disclosure.

The display unit 1, as shown in FIG. 2, includes a display module 10 for displaying a screen thereon. The display module 10 includes a display panel 11 that forms a screen, a backlight 12 that supplies light to the display panel 11, a middle mold 13 that supports an outer portion of the display panel 11, a front chassis 14 that allows an outer portion of the display panel 11 to remain in a state of being supported by the middle mold 13, and a rear chassis 15 that accommodates the backlight 12 and is coupled to a rear side of the middle mold 13.

Also, although not shown in the drawing, the display unit 1 includes various printed circuit boards provided behind the rear chassis 15 for controlling operations of the display apparatus and a case installed to cover a rear side of the display module 10 to shield the printed circuit boards.

Also, optical sheets 124 for improving properties of light supplied by the backlight 12 are arranged between the display panel 11 and the backlight 12.

The optical sheets 124 include a diffusion sheet 124b that receives and diffuses light emitted forward from a light guide plate 121, which will be described below, a prism sheet 124a disposed in front of the diffusion sheet 124b, and a fluorescent sheet 124c used for improving color reproduction performance. In the first embodiment, the fluorescent sheet 124c includes a yellow quantum dot sheet.

The display panel 11 includes a first substrate 111, a second substrate 112, and a liquid crystal layer 113 formed by encapsulating liquid crystals between the first substrate 111 and the second substrate 112 and on which electrodes are provided. Also, the display panel 11 includes a first polarization filter 114 disposed on a rear surface of the first substrate 111 to polarize light incident on the first substrate 111 and a second polarization filter 115 disposed on a front surface of the second substrate 112 to polarize light emitted from the second substrate 112.

The backlight 12 includes the light guide plate 121 formed in a quadrangular plate shape and disposed behind the display panel 11 to be spaced apart therefrom, a reflective sheet 122 disposed on a rear surface of the light guide plate 121 to reflect light, and two light sources 123 disposed to emit light toward both sides of the light guide plate 121.

The light guide plate 121 is formed with a transparent material to guide light, and the reflective sheet 122 is formed to have a white color to diffuse and reflect light.

Each of the light sources 123 includes a substrate 123a extended by a length corresponding to both sides of the light guide plate 121 as shown in FIG. 2 and a plurality of light emitting diodes (LEDs) 123b arranged in one line on the substrate 123a to face a side of the light guide plate 121. In the first embodiment, the LEDs 123b include blue LEDs that generate blue light.

Accordingly, the blue light generated by the LEDs 123b is incident on the light guide plate 121 through both left and right sides of the light guide plate 121 and then emitted through a front surface 121-1 of the light guide plate 121. Since the yellow fluorescent sheet 124c is disposed in front of the light guide plate 121, the blue light emitted from the light guide plate 121 is converted into white light as the light passes through the fluorescent sheet 124c.

Since the diffusion sheet 124b and the prism sheet 124a are sequentially arranged in front of the fluorescent sheet 124c, the white light emitted from the fluorescent sheet 124c is diffused by the diffusion sheet 124b, concentrated by the prism sheet 124a, and then transmitted to the display panel 11 located in front of the prism sheet 124a.

The middle mold 13 is formed in a quadrangular ring shape corresponding to the outer portion of the display panel 11 and includes a panel mounter 131 provided on a front surface thereof to mount and support the display panel 11 and a bottom coupler 132 provided on a rear surface thereof to be coupled with the rear chassis 15.

The front chassis 14 is formed in a quadrangular ring shape corresponding to the outer portion of the display panel 11 and includes a bezel 141 that support an edge of a front surface the display panel 11 and a top side part 142 coupled to the middle mold 13.

The bottom rear 15 is formed in a quadrangular plate shape and includes a rear part 151 that supports the rear surface of the light guide plate 121, and a side part 152 that extends forward from each of four ends of the rear part 151 and is coupled to the middle mold 13. The rear chassis 15 is formed with a metal material having a high heat transfer rate such as aluminum and stainless steel to further diffuse and release heat generated by the backlight 12.

In this display apparatus, bright parts relatively brighter than other parts of the display apparatus may be generated at both sides of the display panel 11 adjacent to the light sources 123 due to light leakage.

Figure 3:
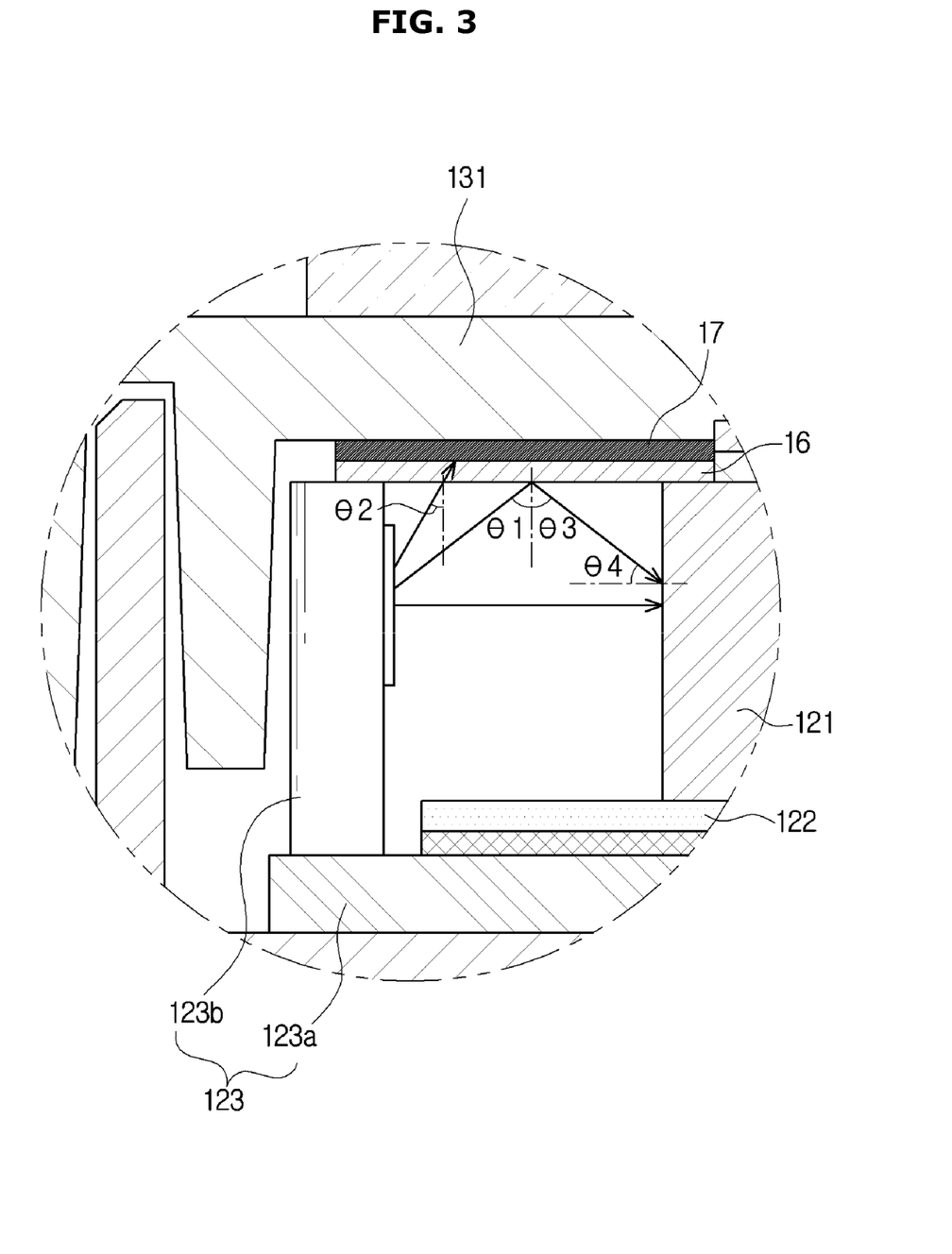
FIG. 3 is an enlarged view illustrating part A of FIG. 2.

Accordingly, to prevent this, the display apparatus includes a dichroic filter 16 disposed to cover a front of a space between the light sources 123 and the light guide plate 121, and a black member 17 disposed in front of the dichroic filter 16. In the embodiment, the dichroic filter 16 and the black member 17 are arranged to cover the front of a space between the LEDs 123b and the side of the light guide plate 121.

The dichroic filter 16 is a filter that selectively passes light depending on a wavelength thereof. In the first embodiment, the dichroic filter 16 may allow the blue light emitted from the LEDs 123b to pass.

The black member 17 is formed with black color to absorb light, and absorbs light that passes through the dichroic filter 16 and is incident through a rear surface of the dichroic filter 16.

In the first embodiment, the black member 17 and the dichroic filter 16 are sequentially arranged on a rear surface of the panel mounter 131, with the black member 17 being arranged in front of the dichroic filter 16.

The above-described dichroic filter 16 has a light transmittance rate that varies according to an incident angle of light incident on the dichroic filter 16.

Figure 4:
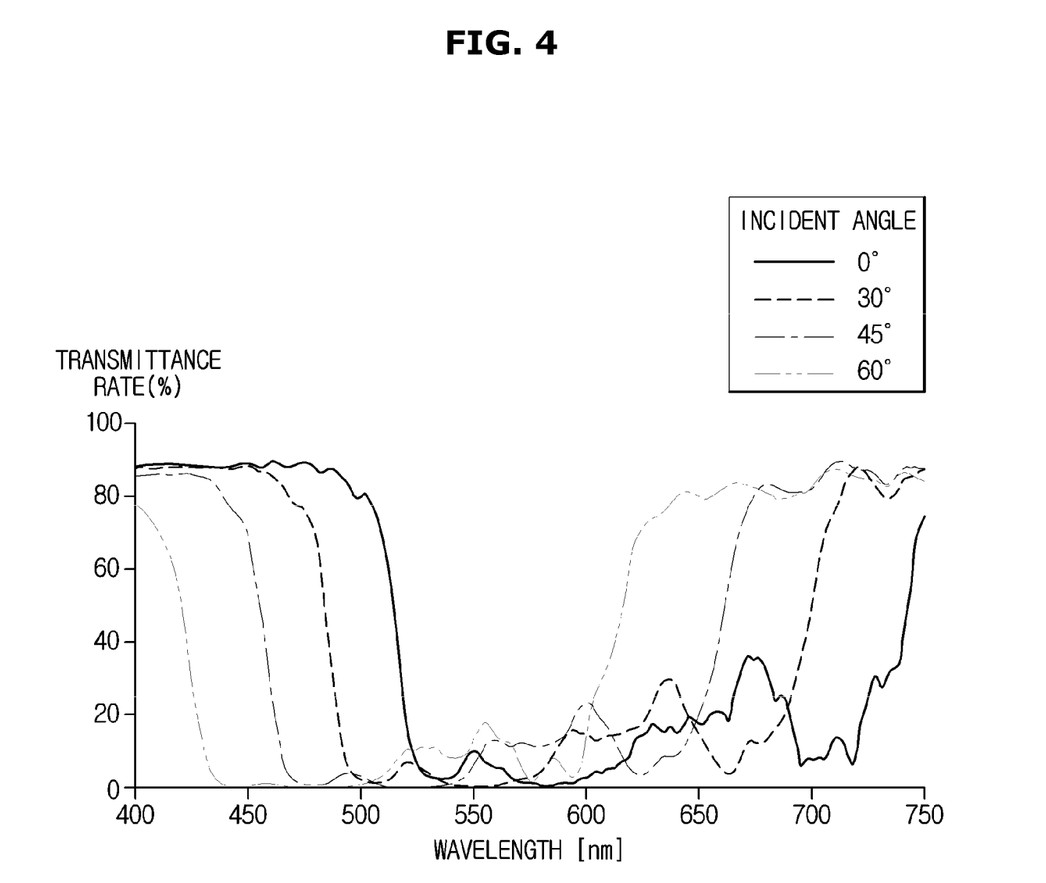
FIG. 4 is a graph illustrating transmittance in relation to a wavelength depending on an incident angle of light incident on a dichroic filter.

FIG. 4 illustrates a graph that shows a light transmittance rate according to an incident angle of light incident on the dichroic filter 16.

As shown in the drawing, as a filter-incident angle of light incident on the dichroic filter 16 decreases, a light transmittance rate increases while a light reflection rate decreases. Also, as the filter-incident angle increases, the light transmittance rate decreases while the light reflection rate increases. As shown in FIG. 3, the angle of incidence is the angle between a light ray incident on a rear surface of the dichroic filter 16 and a line perpendicular to the rear surface of the dichroic filter 16 at the point of incidence.

Accordingly, as shown in FIG. 3, of the light emitted from the LEDs 123b toward the dichroic filter 16, light incident on the dichroic filter 16 at a great filter incident angle $\theta 1$ is generally reflected while light incident on the dichroic filter 16 at a small filter incident angle $\theta 2$ generally passes through the dichroic filter 16 and is absorbed by the black member 17.

Also, in the first embodiment, the rear surface of the dichroic filter 16 and the side of the light guide plate 121 form a right angle, and a reflection angle $\theta 3$ of the light reflected by the dichroic filter 16 is the same as the filter-incident angle $\theta 1$. Accordingly, a sum of the filter-incident angle $\theta 1$ of the reflected light and a light guide plate incident angle $\theta 4$ is 90 degrees, and the filter-incident angle $\theta 1$ and the light guide plate incident angle $\theta 4$ are inversely proportional to each other. For example, when light whose filter-incident angle $\theta 1$ is 60 degrees is reflected by the dichroic filter 16 and incident on the side of the light guide plate 121, the light guide plate incident angle $\theta 4$ of the light is 30 degrees.

Accordingly, of the light emitted forward from the LEDs 123b toward the dichroic filter 16, only light whose filter incident angle $\theta 1$ is great is reflected and incident on the side of the light guide plate 121. Since the filter incident angle $\theta 1$ and the light guide plate incident angle $\theta 4$ of the reflected light are inversely proportional to each other, the light guide plate incident angle $\theta 4$ of the light reflected by the dichroic filter 16 and incident on the side of the light guide plate 121 is small, that is, at or below a certain value. The light having the light guide plate incident angle $\theta 4$ at or below the certain value may be incident on the light guide plate 121 as it is. Accordingly, the incidence of light having a great incident angle at or above the certain value on the side of the light guide plate 121 is suppressed by the dichroic filter 16 and the black member 17 because such light passes through the dichroic filter 16 and is absorbed by the black member 17.

As described above, of light emitted forward from the LEDs 123b, light having the small filter incident angle $\theta 2$ passes through the dichroic filter 16 and is absorbed by the black member 17, and light having the great filter incident angle $\theta 1$ is reflected by the dichroic filter 16, transferred to the side of the light guide plate 121 having the small filter incident angle $\theta 4$ at or below the certain value, and incident on the light guide plate 121. That is, the light emitted forward from the LEDs 123b is generally absorbed by the black member 17 or incident on the light guide plate 121.

Accordingly, the occurrence of bright parts that may be generated when the light emitted forward from the LEDs 123b leaks into the display panel 11 without passing through the light guide plate 121 is suppressed by the dichroic filter 16 and the black member 17.

In the above first embodiment, the fluorescent sheet 124c, which includes the quantum dot sheet, is disposed between the display panel 11 and the light guide plate 121. However, the embodiment is not limited thereto. The display panel 11 may include a quantum dot color filter 116 as in a second embodiment of the present disclosure shown in FIG. 5.

Figure 5:
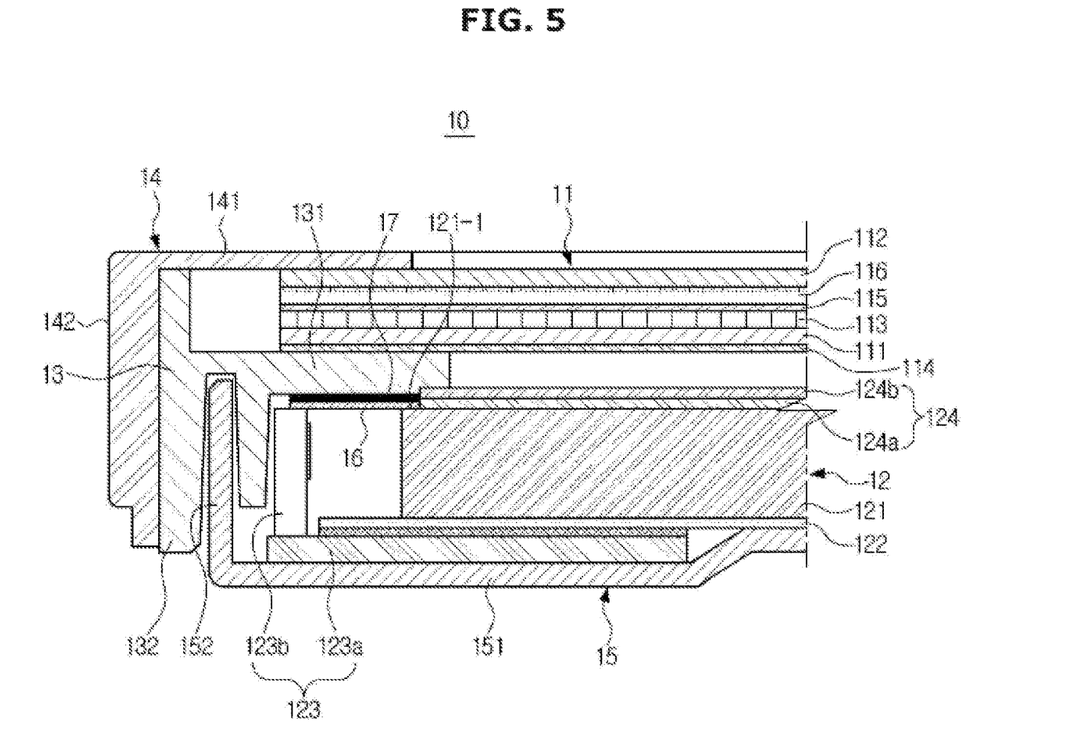
FIG. 5 is a cross-sectional view of a display apparatus according to a second embodiment of the present disclosure.

The display panel 11 applied to a display apparatus according to the second embodiment of the present invention includes the first substrate 111, the second substrate 112, the first polarization filter 114 disposed on the rear surface of the first substrate 111, the quantum dot color filter 116 disposed on the rear surface of the second substrate 112, the second polarization filter 115 disposed on a rear surface of the quantum dot color filter 116, and the liquid crystal layer 113 disposed between the second polarization filter 115 and the first substrate 111.

The light sources 123 include the substrate 123a and the LEDs 123b, and the LEDs 123b include blue LEDs that generate blue light.

The quantum dot color filter 116 includes a red light converter that converts blue light transmitted thereto from the rear into red light, a green light converter that converts the blue light transferred thereto from the rear into green light, and a blue light transmission portion that transmits the blue light as it is.

In the display apparatus configured as described above, a front of a space between the LEDs 123b and the light guide plate 121 is covered to suppress light leakage into a part of the display panel 11 adjacent to the light sources 123.

In the embodiments described above, the two light sources 123 are provided and arranged to emit light toward both of the sides of the light guide plate 121, but this is merely an example. Two light sources may be arranged to emit light toward a top surface and a bottom surface of a light guide plate or one light source may be disposed to emit light toward any one of four sides such as top, bottom, left, and right sides of the light guide plate. Also, four light sources may be arranged to emit light toward the four sides, such as the top, bottom, left, and right sides, of the light guide plate, respectively.

As should be apparent from the above description, a display apparatus in accordance with one embodiment of the present disclosure includes a dichroic filter and a black member to cover a front of a space between a light source and a light guide plate such that most of the light emitted from the light source toward the dichroic filter may be absorbed by the black member or incident on the light guide plate, thereby preventing the occurrence of a bright part caused by light leakage.

It should be obvious to one of ordinary skill in the art that the present disclosure is not limited to the above-described embodiments and is variously modifiable or changeable without departing from the scope of the concept of the present disclosure. Accordingly, modified or changed examples thereof should be included in the claims of the present disclosure.

What is claimed is:

1. A display apparatus comprising:
a display panel;
a light guide plate disposed behind the display panel and configured to transmit light having a first wavelength in a forward direction toward the display panel;
a light source disposed to emit the light having the first wavelength toward a side of the light guide plate;
a rear chassis to accommodate the light guide plate and the light source;
a middle mold including a panel mounter to support an outer portion of the display panel and a bottom coupler to be coupled with the rear chassis;
a dichroic filter disposed to cover a front of a space between the light source and the side of the light guide plate, the dichroic filter being configured to selectively transmit the light having the first wavelength; and
a black member disposed in front of the dichroic filter,
wherein a light transmittance rate of the dichroic filter decreases as an angle of incidence of light incident upon the dichroic filter increases; and
wherein the black member and the dichroic filter are arranged on a rear surface of the panel mounter to cover a front surface of the light guide plate.

2. The display apparatus of claim 1, wherein the light source comprises a plurality of light emitting diodes (LEDs) arranged to emit light toward the side of the light guide plate, and
wherein the dichroic filter is disposed to cover the front of the space between the plurality of LEDs and the side of the light guide plate.

3. The display apparatus of claim 2, further comprising a fluorescent sheet formed with a yellow color and disposed between the display panel and the light guide plate,
wherein the plurality of LEDs comprises blue LEDs configured to generate blue light.

4. The display apparatus of claim 3, wherein the fluorescent sheet comprises a quantum dot sheet.

5. The display apparatus of claim 2, wherein the display panel comprises a quantum dot color filter.

6. The display apparatus of claim 5, wherein the plurality of LEDs comprises blue LEDs configured to generate blue light, and
wherein the quantum dot color filter comprises a red light converter configured to convert the blue light into red light, a green light converter configured to convert the blue light into green light, and a light transmission portion configured to transmit the blue light.

7. A display apparatus comprising:
a display panel;
a light guide plate disposed behind the display panel and configured to transmit light having a first wavelength in a forward direction toward the display panel;
a quantum dot sheet disposed between the display panel and the light guide plate;
a plurality of LEDs configured to generate the light having the first wavelength and disposed to emit the light toward a side of the light guide plate;
a rear chassis to accommodate the light guide plate and the plurality of LEDs;
a middle mold including a panel mounter to support an outer portion of the display panel and a bottom coupler to be coupled with the rear chassis;
a dichroic filter disposed to cover a front of a space between the plurality of LEDs and the side of the light guide plate, the dichroic filter being configured to selectively transmit the light having the first wavelength; and
a black member disposed in front of the dichroic filter,
wherein a light transmittance rate of the dichroic filter decreases as an angle of incidence of light incident upon the dichroic filter increases and
wherein the black member and the dichroic filter are arranged on a rear surface of the panel mounter to cover a front surface of the light guide plate.

8. A display apparatus comprising:
a display panel comprising a quantum dot color filter;
a light guide plate disposed behind the display panel and configured to transmit light having a first wavelength in a forward direction toward the display panel;
a plurality of LEDs configured to generate the light having the first wavelength and disposed to emit the light toward a side of the light guide plate;
a rear chassis to accommodate the light guide plate and the plurality of LEDs;
a middle mold including a panel mounter to support an outer portion of the display panel and a bottom coupler to be coupled with the rear chassis;
a dichroic filter disposed to cover a front of a space between the plurality of LEDs and the side of the light guide plate, the dichroic filter being configured to selectively transmit the light having the first wavelength; and
a black member disposed in front of the dichroic filter,
wherein a light transmittance rate of the dichroic filter decreases as an angle of incidence of light incident upon the dichroic filter increases and
wherein the black member and the dichroic filter are arranged on a rear surface of the panel mounter to cover a front surface of the light guide plate.

9. The display apparatus of claim 8, wherein the light having the first wavelength is blue light,
wherein the quantum dot color filter comprises a red light converter configured to convert the blue light into red light and a green light converter configured to convert the blue light into green light, and
wherein the quantum dot filter is configured to transmit the blue light, the converted red light, and the converted green light.

10. The display apparatus of claim 1, wherein the side of the light guide plate is disposed at an edge of the light guide plate.

11. The display apparatus of claim 7, wherein the side of the light guide plate is disposed at an edge of the light guide plate.

12. The display apparatus of claim 8, wherein the side of the light guide plate is disposed at an edge of the light guide plate.

13. The display apparatus of claim 1,
wherein the light guide plate is configured to transmit light in a forward direction toward the display panel, and wherein an optical axis of the light emitted by the light source is perpendicular to the forward direction.

14. The display apparatus of claim 7,
wherein the light guide plate is configured to transmit light in a forward direction toward the display panel, and
wherein an optical axis of the light emitted by the plurality of LEDs is perpendicular to the forward direction.

15. The display apparatus of claim 8,
wherein the light guide plate is configured to transmit light in a forward direction toward the display panel, and
wherein an optical axis of the light emitted by the plurality of LEDs is perpendicular to the forward direction.

16. The display apparatus of claim 1, wherein a portion of the dichroic filter contacts the front surface of the light guide plate.

17. The display apparatus of claim 7, wherein a portion of the dichroic filter contacts the front surface of the light guide plate.

18. The display apparatus of claim 8, wherein a portion of the dichroic filter contacts the front surface of the light guide plate.

\* \* \* \* \*